(12) United States Patent
Nawrocki

(10) Patent No.: US 6,256,116 B1
(45) Date of Patent: *Jul. 3, 2001

(54) METHOD AND APPARATUS FOR BLOCKING FACSIMILE

(75) Inventor: Diane L. Nawrocki, Nottingham, NJ (US)

(73) Assignee: AT&T Corporation, New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/092,067
(22) Filed: Jun. 5, 1998
(51) Int. Cl.[7] .................................................. H04N 1/32
(52) U.S. Cl. ........................................... 358/442; 358/468
(58) Field of Search .................................. 358/442, 440, 358/439, 434, 468, 407, 402, 405; 379/142

(56) References Cited

U.S. PATENT DOCUMENTS

| | | | |
|---|---|---|---|
| 5,168,376 | * 12/1992 | Motohama | 358/437 |
| 5,406,387 | * 4/1995 | Yamamoto | 358/407 |
| 5,452,099 | * 9/1995 | Von Meister | 358/403 |
| 5,555,100 | * 9/1996 | Bloomfield et al. | 358/402 |
| 5,936,744 | * 8/1999 | Choi | 358/440 |
| 6,014,228 | * 1/2000 | Castro | 358/400 |

* cited by examiner

*Primary Examiner*—Jerome Grant, II
*Assistant Examiner*—Kevin Kianni
(74) *Attorney, Agent, or Firm*—Oliff & Berridge, PLC

(57) ABSTRACT

A method and apparatus for blocking facsimile signals at telephone stations is provided. A facsimile device may erroneously attempt to contact a telephone station through the telephone network. In one embodiment, a facsimile blocking device may recognize a facsimile transmission, determine if the called party is a subscriber, and block the facsimile transmission. In addition, the facsimile blocking device may send a signal to the facsimile device indicating that it is transmitting to an incorrect telephone number. In another embodiment, a called party may receive the facsimile signal and enter a predetermined blocking request code. The facsimile blocking device receives the code from the called party and blocks the facsimile transmission.

23 Claims, 5 Drawing Sheets

100

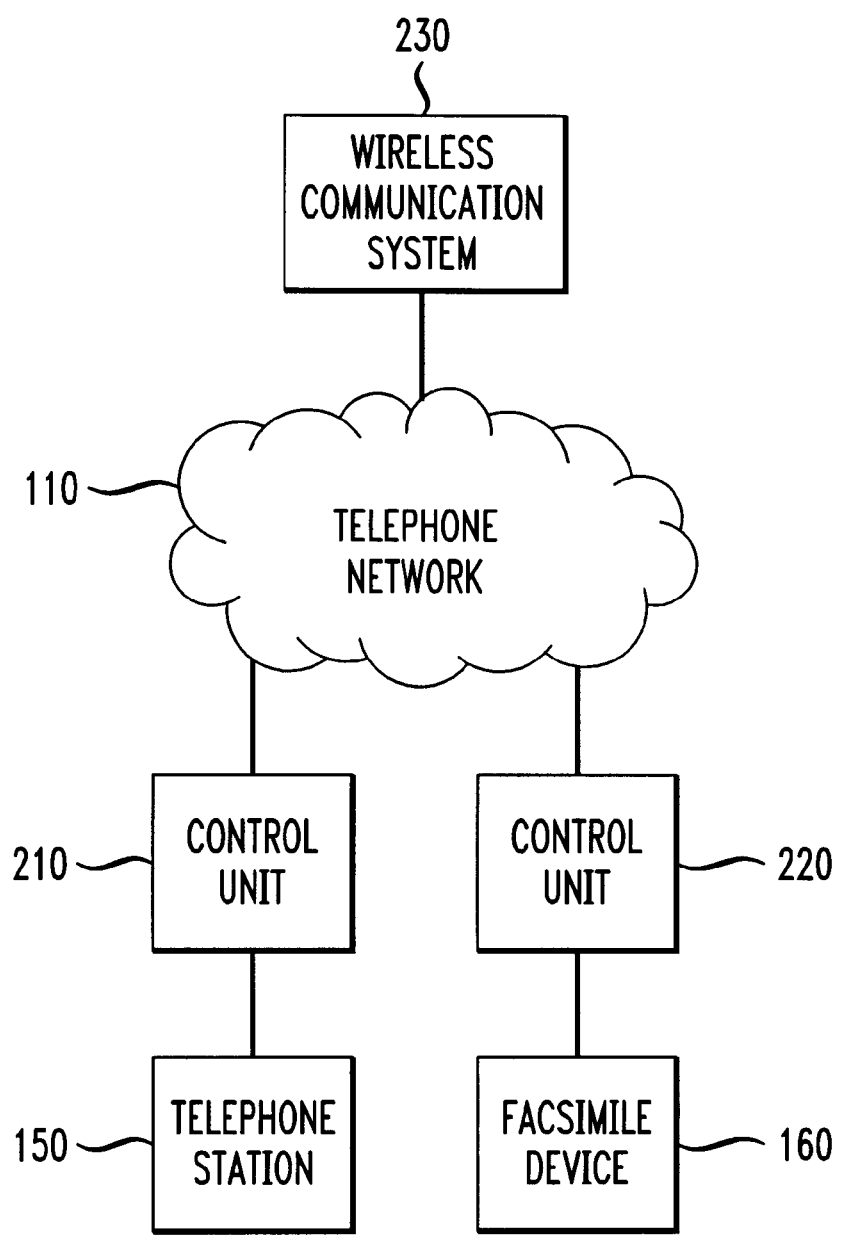

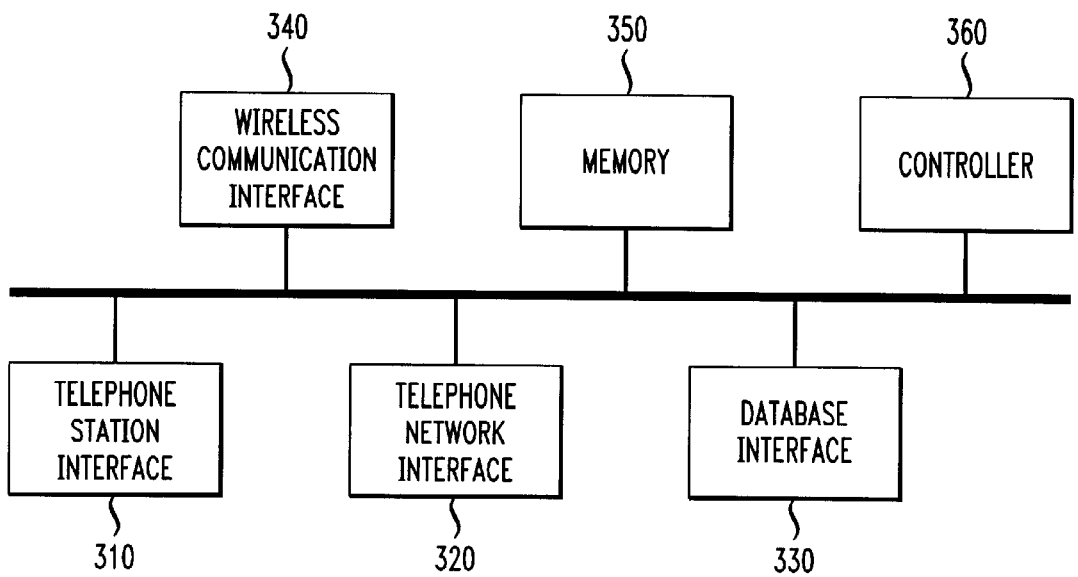

METHOD AND APPARATUS FOR BLOCKING FACSIMILE

BACKGROUND OF THE INVENTION

1. Field of Invention

This invention relates to the handling of attempted transmissions from facsimile machines which are inadvertently received by telephone stations. In particular, this invention is directed to the automatic blocking of unwanted facsimile transmissions by called parties.

2. Description of Related Art

The use of facsimile machines is becoming more prevalent in both the home and the office. In addition, many personal computers contain modems and related software to transmit and receive facsimiles of electronic documents.

Many of these facsimile devices have the capability to automatically re-dial the telephone number of the destination facsimile machine if, for example, a busy signal is detected or a proper connection is not made. These re-dialing systems continue to automatically re-dial the telephone number entered by the facsimile user after a predetermined time delay until the facsimile data is transmitted.

However, if the facsimile operator has entered an incorrect facsimile telephone number, the sending facsimile machine will continue to attempt to contact the destination facsimile machine repeatedly with no hope of success. This situation creates an inefficient use of resources for the facsimile operator and can be a considerable annoyance to the called party receiving repeated misdirected transmission attempts.

SUMMARY OF THE INVENTION

A method and apparatus for blocking facsimile signals at telephone stations is provided. A facsimile device may erroneously attempt to contact a telephone station through the telephone network. In one embodiment, a facsimile blocking device may recognize a facsimile transmission, determine if the called party is a subscriber, and block the facsimile transmission. In addition, the facsimile blocking device may send a signal to the facsimile device indicating that it is transmitting to an incorrect telephone number.

In another embodiment, a called party may receive the facsimile signal and enter a predetermined blocking request code. The facsimile blocking device may receive the code from the called party and block the facsimile transmission. For example, a telecommunications network may prevent unwanted reception of facsimile transmissions at a telephone station by receiving a dual tone multifrequency (DTMF) code and blocking the transmission to the called party's telephone station.

These and other features and advantages of this invention are described in or are apparent from the following detailed description of the preferred embodiment.

BRIEF DESCRIPTION OF THE DRAWINGS

The invention is described in detail with reference to the following drawings, wherein like numerals represent like elements, and wherein:

FIG. 2 is an exemplary block diagram of a distributed telephone network;

FIG. 3 is an exemplary block diagram of a facsimile blocking device;

FIG. 4 is an exemplary diagram of a subscriber list;

DETAILED DESCRIPTION OF PREFERRED EMBODIMENTS

Figure 1:
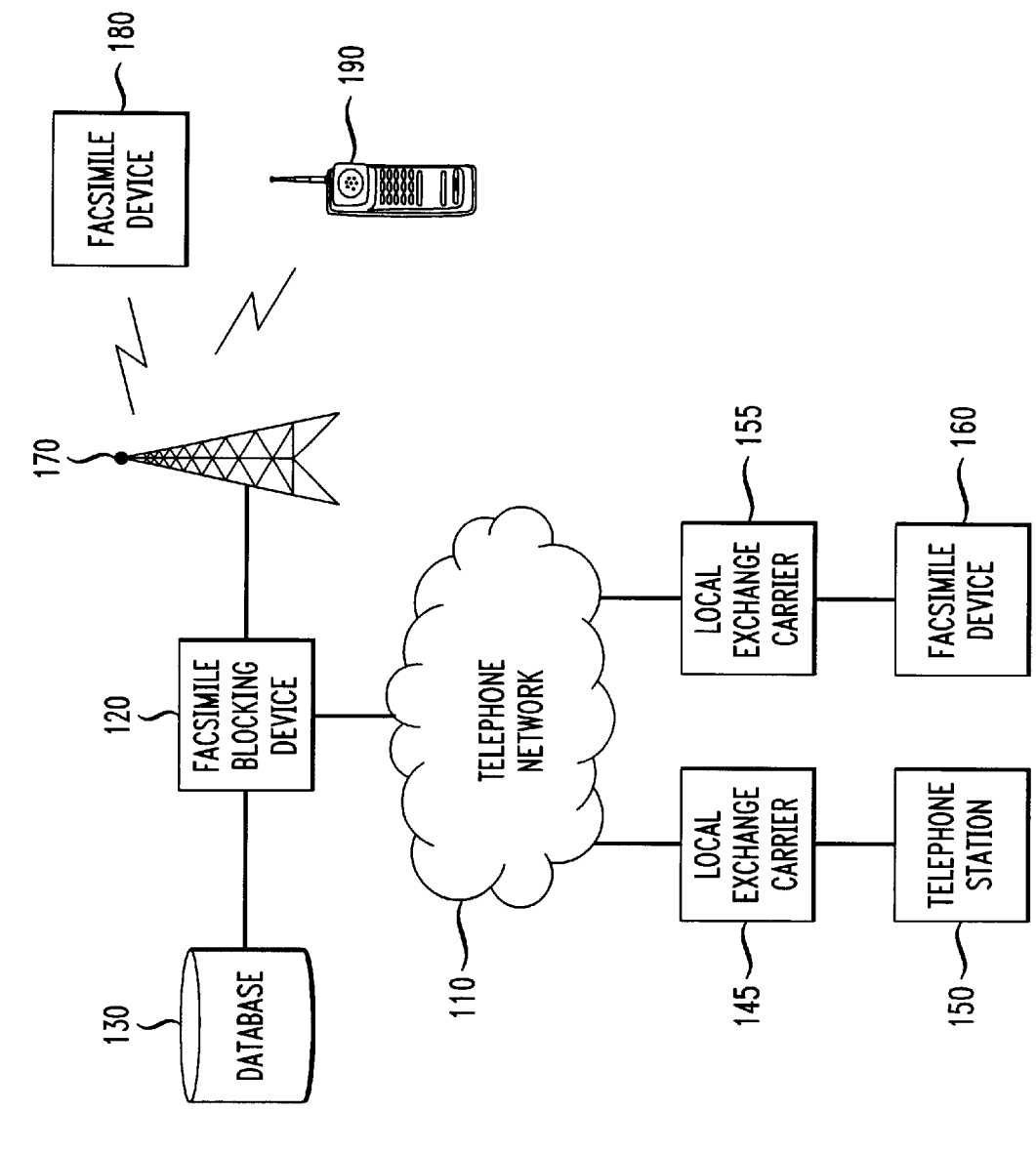
FIG. 1 is an exemplary diagram of a telephone network.

FIG. 1 shows an exemplary embodiment of a facsimile blocking system 100 that includes a telephone network 110 connected to telephone station 150 via a local exchange carrier 145 and a facsimile device 160 via a local exchange carrier 155. The local exchange carriers 145, 155 include well known switching technologies for connecting and routing calls (i.e., the Lucent 5ESS, etc.). The telephone station 150 and facsimile devices 160, 180 may also be personal computers or any other device which may send and receive communications. The telephone network 110 is also connected to a facsimile blocking device 120.

The facsimile blocking device 120 is connected to a database 130. The database 130 may be any memory device internal or external to the facsimile blocking device 120. The facsimile blocking device 120 is coupled to a wireless communications tower 170, such as a mobile base station for the cellular phone 190 in order to wirelessly communicate with portable communication devices, such as the wireless facsimile device 180.

When the facsimile device 160 attempts to transmit facsimile data to the telephone station 150, the call is routed through the local exchange carrier 155 through the telephone network 110 (i.e., 5ESS) to the facsimile blocking device 120. The facsimile blocking device 120 recognizes the facsimile signal using any known facsimile signal recognition device, such as a 2100 Hertz tone detector, for example. Once the facsimile signal is recognized, the facsimile blocking device 120 checks the database 130 to determine if the called party is a subscriber. If the called party is a subscriber, the facsimile blocking device 120 blocks the call.

While FIG. 1 shows the facsimile blocking device 120 as a centralized unit, the facsimile blocking device 120 may be distributed throughout the telephone network 110. When distributed, the local exchange carriers 145, 155 serve as control units of the facsimile blocking device 120, and thus perform all of its functions. For the following description, a distributed facsimile blocking device 120 is assumed for ease of discussion.

FIG. 2 shows an exemplary block diagram of a distributed facsimile blocking system 200. The telephone network 110 is connected to the telephone station 150 and the facsimile device 160 through control units 210, 220, respectively. The control units 210, 220 interface with the telephone network 110 and serve as control units of the facsimile blocking device 120 performing all of its functions. For ease of discussion, the control units 210, 220: 1) are assumed to be similar in structure; 2) may handle more than one telephone station of a facsimile device; and 3) include a database similar to the database 130 as an internal or external memory. When the database is external, it may be centralized even if the facsimile blocking device 120 is distributed. The database, whether distributed or centralized, is referred to as the database 130. The telephone network 110 is coupled to the wireless communication system 230, which provides broadcasting capabilities to wirelessly communicate with portable communication devices, such as facsimile devices and cellular telephones.

When a facsimile device 160 attempts to transmit facsimile data to telephone station 150, the call is routed through the facsimile device's control unit 220, the telephone network 110, and the called party's control unit 210. If the control unit 210 determines that the incoming call is a facsimile signal, the control unit 210 determines whether the called party at telephone station 150 is a subscriber. If the called party is a subscriber, the control unit 210 blocks the facsimile signal.

In addition, the control unit 210 may check a subscriber's profile, which may include several options, such as methods for notifying the telephone station 150 that a facsimile signal has been received, etc. In addition, the control unit 210 may perform optional features, such as contacting the facsimile device 160 to notify the facsimile device or the facsimile device operator that the facsimile device 160 is attempting to contact a telephone station 150, and not the facsimile device desired. This notification process may be accomplished, for example, by a return facsimile, an e-mail, or a plain electronic signal to the facsimile device 160 to cease transmission. The facsimile device 160 may be equipped with software to recognize these electronic signals, and to provide the operator with a detailed error message. The operator may then check the telephone number and retransmit to the correct facsimile telephone number, for example.

Alternatively, the facsimile transmission from the facsimile device 160 may be received and "answered" by the facsimile blocking device 120. In this regard, the facsimile blocking device 120 may signal the facsimile device 160 that the facsimile transmission has been received. Once the "facsimile received" signal is received, the facsimile device 160 may cease any further transmissions to the incorrect number. This option may include any of the above notification options, including a return facsimile, electronic error signal, etc.

In an alternative embodiment, the called party at telephone station 150 may manually block the signal by entering a "star (*)" code, for example. If facsimile device 160 attempts to transmit facsimile data to telephone station 150, the facsimile signal is sent through control units 220, 210 and telephone network 110. Control unit 210 routes the signal to telephone station 150. The called party, upon hearing the facsimile signal, presses "*XX" on the telephone keyboard, which signals the control unit 210 to block the facsimile data transmission.

The control unit 210 may then perform a system option, such as those described above to notify the facsimile device 160 that it is transmitting to an incorrect telephone number, for example. The system options are similar to the subscriber profile options except that they are determined by the facsimile blocking system 100 provider. For example, if one of the system options for the control unit 210 to perform is to block the facsimile transmission for a predetermined time, the control unit 210 identifies the telephone number of the facsimile device 160 using an Automatic Number Identification (ANI) device, for example, and stores the number with the called party's telephone information in the database 130.

If the facsimile device 160 then makes another attempt to transmit facsimile data to the telephone station 150, the control unit 210 will recognize the telephone number of the facsimile device 160 from the information stored in the database 130, and determine if the predetermined time-limit has expired. If the predetermined time has not expired, then the control unit 210 blocks the facsimile transmission. If the predetermined time-limit has expired, the control unit 210 processes the call.

FIG. 3 is a block diagram of the control unit 210 which is representative of the control units 210, 220 of the facsimile blocking device 120. The control unit 210 includes a controller 360 and a memory 350, and may also include a telephone network interface 320, a telephone station interface 310, a wireless communication interface 340, and a database interface 330. However, the control unit 210 may include any structure that performs the functions of the facsimile blocking device 120 disclosed herein.

When the facsimile device 160 attempts to transmit facsimile data, the facsimile signal is received by the controller 360 through the telephone network interface 320. If the controller 360 determines that the incoming signal is a facsimile signal, the controller 360 retrieves the subscriber's profile information from either the memory 350 or an external database through the database interface 330. The controller 360 blocks the call and performs any of the options in the subscriber profile or any system options discussed above.

In the alternative embodiment, the controller 360 would receive the facsimile signal through the telephone network interface 320 and forward the signal to the telephone station 150 through the telephone station interface 310. If the called party at telephone station 150 enters the "*XX" code to indicate that the called party desires the facsimile to be blocked, the controller 360 receives this signal through the telephone station interface 310 and blocks the call. The controller 360 then performs any system options as discussed above.

If one of the system options of the controller 360 is to block the facsimile transmission for a predetermined time, the controller 360 identifies the telephone number of the facsimile device 160 and stores the number with the called party's telephone information in the memory 350.

If the facsimile device 160 then makes another attempt to transmit facsimile data to the telephone station 150, the controller 360 will recognize the facsimile device's 160 telephone number from the information stored in the memory 350, and determine if the predetermined time-limit has expired. If the predetermined time has not expired, then the controller 360 blocks the facsimile transmission. If the predetermined time-limit has expired, the controller 360 processes the call. The wireless communication system 230 may also perform these control functions for wireless communication devices.

FIG. 4 illustrates an example of a subscriber profile 400 which may be stored in the database 130. For example, the subscriber profile 400 may include: 1) the subscriber (or called party) ID number 410; 2) a time limit 420 for blocking the incoming facsimile signal from the facsimile device; 3) contact information 430 on whether and how to contact the sending facsimile device 160; and 4) particular or known facsimile telephone numbers 440 that the subscriber desires to be blocked. The items in the subscriber profile information 400 may be pre-selected by the system or by the subscriber and forwarded to the control unit 210 when a facsimile transmission is detected to the subscriber's telephone station. In this manner, a subscriber can give the facsimile blocking device 120 several customized options so that the subscriber will not be bothered by errant facsimile signals.

Figure 5:
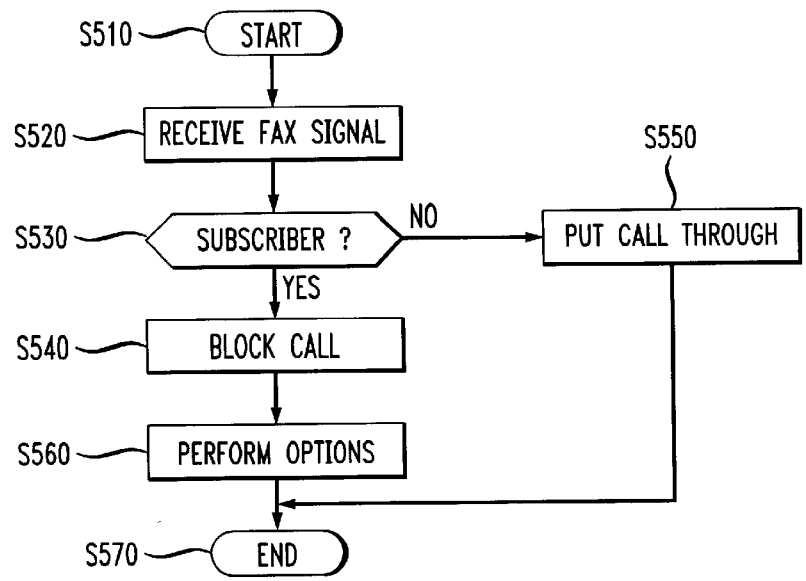
FIG. 5 is a flowchart of the automatic facsimile blocking process.

FIG. 5 is a flowchart describing the facsimile blocking system process at the subscriber's control unit 210. Beginning at step S510, control goes to step S520 where the controller 360 receives the incoming facsimile signal from the facsimile device 160. At step S530, if the controller 360 determines that the called party is a subscriber, the controller goes to step S540; otherwise, the controller goes to step S550. At step S540, the controller 360 blocks the call and goes to step S560 to perform any options. The controller then goes to step S570 and ends. At step S550, if the called party is not a subscriber, the controller 360 connects the call, goes to step S570 and ends.

Figure 6:
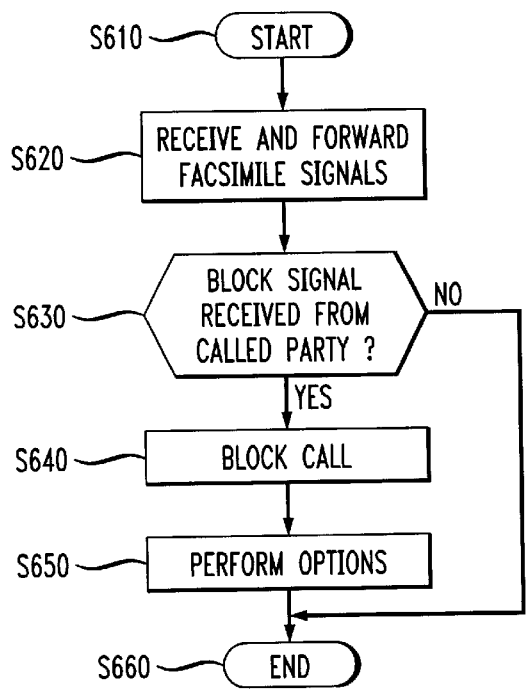
FIG. 6 is a flowchart of the operator-entered facsimile blocking process.

FIG. 6 is a flowchart of the alternative embodiment. Beginning at step S610, control goes to step S620 where the controller 360 receives and forwards the facsimile signal to the telephone station 150 through the telephone station interface 310. At step S630, the controller determines whether a "*XX" blocking request signal has been received from the called party. If no blocking request signal is received, control goes to step S660 and ends. However, if the controller 360 receives a blocking signal from the called party, the controller goes to step S640 and blocks the call. At step S650, the controller 360 performs any system options, and then goes to step S660 and ends.

Figure 7:
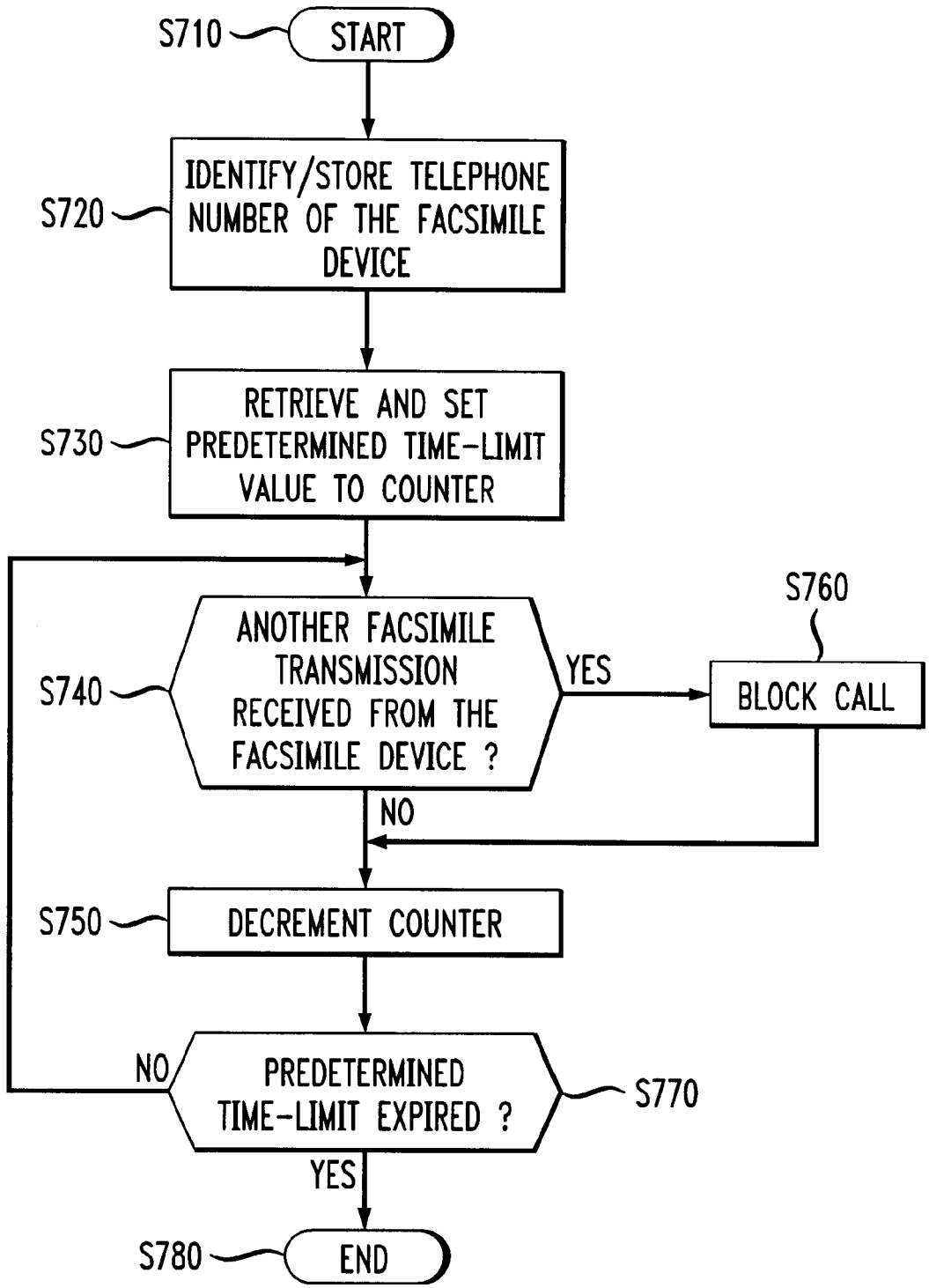
FIG. 7 is a flowchart of the predetermined time-limit option.

FIG. 7 is a flowchart describing the controller's 360 facsimile transmission monitoring process option. Beginning at step S710, control goes to step S720 where the controller 360 identifies the telephone number of the facsimile device 160, and stores the number with the called party's telephone information in the memory 350. The process then goes to step S730 where the controller 360 retrieves the predetermined time-limit from memory 350, and goes to step S740.

At step S740, the controller 360 determines if the facsimile device 160 has made another attempt to transmit facsimile data to the telephone station 150 (i.e., recognizes the facsimile device's 160 telephone number from the number stored in memory 350). If the controller 360 determines that the facsimile device 160 is attempting to transmit facsimile data, at step S760, the controller 360 blocks the facsimile transmission. Otherwise, the controller 360 goes to step S750 and decrements a counter, and goes to step S770. At step S770, the controller 360 determines if the predetermined time-limit has expired. If the predetermined time limit has not expired, then the controller 360 goes back to step S740. If the predetermined time-limit has expired, the controller 360 goes to step S780 and ends.

The facsimile blocking device 120 may be implemented on a general purpose computer. However, the facsimile blocking device 120 may also be implemented using a special purpose computer, a microprocessor, or microcontroller and peripheral integrated circuit elements, and Application Specific Integrated Circuits (ASIC) or other integrated programmable logic devices, such as a PLD, PLA, FGPA, or PAL, or the like. Furthermore, the functions of the facsimile blocking device 120 may be performed by a stand alone unit or distributed throughout a communication system. In general, any device for performing the f unctions of a facsimile blocking device 120, as described herein, may be used.

In addition, while called parties have been represented as facsimile blocking system subscribers, alternatively, a facsimile blocking system operator may bill called parties on a per-use basis, such as when the called party enters the "*XX" code.

While this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the invention as described in the following claims.

What is claimed is:

1. A method for preventing unwanted receipt of a facsimile transmission at a telephone station, comprising:
   receiving in a telecommunications network, a facsimile transmission sent by a calling party directed to a telephone station of called party not desirous of receiving the transmission; and
   blocking by a facsimile blocking device of the telecommunications network the transmission to the called party's telephone station,
   wherein the facsimile blocking device is located remote from either the called party or the calling party location.

2. The method of claim 1, further comprising:
   determining if the called party is a subscriber, wherein the blocking step is performed only if the called party is a subscriber.

3. The method of claim 2, wherein the blocking step blocks facsimile transmissions from a particular facsimile device specified by the subscriber.

4. The method of claim 1, further comprising:
   recognizing the facsimile transmission.

5. The method of claim 1, further comprising:
   directing the received facsimile transmission to the called party's telephone station; and
   receiving a facsimile blocking request from the called party's telephone station.

6. The method of claim 5, wherein the receiving step includes receiving a manually entered (DTMF) code.

7. The method of claim 5, wherein the blocking step blocks the facsimile transmission for a predetermined time.

8. The method of claim 7, further comprising:
   identifying and storing a telephone number of the facsimile device;
   receiving a subsequent facsimile transmission from the facsimile device within the predetermined time;
   recognizing the telephone number of the facsimile device; and
   blocking the subsequent facsimile transmission.

9. The method of claim 1, further comprising:
   notifying the facsimile device that the facsimile transmission has been blocked.

10. The method of claim 9, wherein the notifying step includes notifying the facsimile device using an electronic signal.

11. The method of claim 9, wherein the notifying step includes notifying the facsimile device using a facsimile transmission.

12. A facsimile blocking system in a telecommunications network comprising:
    a facsimile blocking device of the telecommunications network that blocks a facsimile transmission sent by a calling party directed to a telephone station of a called party not desirous of receiving the transmission wherein the facsimile blocking device is located remote from either the called party or the calling party location, the facsimile blocking device including a controller; and
    a database coupled to the facsimile blocking device, wherein the controller determines if a called party is a subscriber, and if the called party is a subscriber, the controller blocks the facsimile transmission.

13. The system of claim 12, wherein the controller determines if the called party is a subscriber, and if the called party is a subscriber, the controller blocks the facsimile transmission.

14. The system of claim 13, wherein the controller blocks facsimile transmissions from a particular facsimile device specified by the subscriber.

15. The system of claim 12, further comprising:

a facsimile recognition device that recognizes facsimile transmission signals from other signals.

16. The system of claim 12, wherein the controller directs the received facsimile transmission to the called party's telephone station, and the controller blocks the facsimile transmission when the controller receives a facsimile blocking request from the called party's telephone station.

17. The system of claim 16, wherein the controller blocks the received facsimile transmission upon receiving a manually entered (DTMF) code from the called party's telephone station.

18. The system of claim 16, wherein the controller blocks the facsimile transmission for a predetermined time.

19. The system of claim 18, wherein the controller identifies and stores a telephone number of the facsimile device in the database, receives a subsequent facsimile transmission from the facsimile device within the predetermined time, recognizes the telephone number of the facsimile device and blocks the subsequent facsimile transmission.

20. The system of claim 12, further comprising:

a facsimile device that transmits facsimile transmissions, wherein the facsimile device transmits a facsimile to notify the facsimile device that the facsimile transmission has been blocked.

21. The system of claim 20, wherein the controller notifies the facsimile device using an electronic signal.

22. The system of claim 20, wherein the controller notifies the facsimile device using a facsimile transmission.

23. A facsimile blocking system in a telecommunications network, comprising:

receiving means for receiving a facsimile transmission sent by a calling party directed to a telephone station of a called party not desirous of receiving the transmission; and facsimile blocking means for blocking the transmission to the called party's telephone station, wherein the facsimile blocking means is located remote from either the called party or the calling party location.

* * * * *